Aug. 24, 1926.

W. C. DEVER 1,597,514

TESTING SULPHUR DIOXIDE

Original Filed August 1, 1925

William C. Dever
Inventor by Smith & Freeman
Attorneys

Patented Aug. 24, 1926.

1,597,514

UNITED STATES PATENT OFFICE.

WILLIAM C. DEVER, OF DETROIT, MICHIGAN, ASSIGNOR TO KELVINATOR CORPORATION, OF DETROIT, MICHIGAN, A CORPORATION OF MICHIGAN.

TESTING SULPHUR DIOXIDE.

Original application filed August 1, 1925, Serial No. 47,507. Divided and this application filed March 8, 1926. Serial No. 93,128.

This invention relates to mechanical refrigeration and has for its object the provision of a simple, practical and reliable method of testing sulphur dioxide technically for its moisture content. Sulphur dioxide is successful as a refrigerant only when substantially free from moisture inasmuch as any appreciable quantity of dissolved water reacts upon the sulphur dioxide with the production of corrosive fluid, while any presence of atmospheric oxygen in addition to the moisture enhances the corrosive effect with the result that pistons bind, valves stick, pipes become corroded, and lubrication is injured; while if the refrigerant be anhydrous it exhibits no injurious effect upon the mechanism. I have discovered that the maximum permissible water content is about .06% and the herein described improvements in apparatus and method have been devised for the purpose of facilitating analysis by comparatively untrained men and equally available to the maker and the user of sulphur dioxide.

This application is a division of my prior application No. 47,507, filed August 1, 1925.

Figure 1:
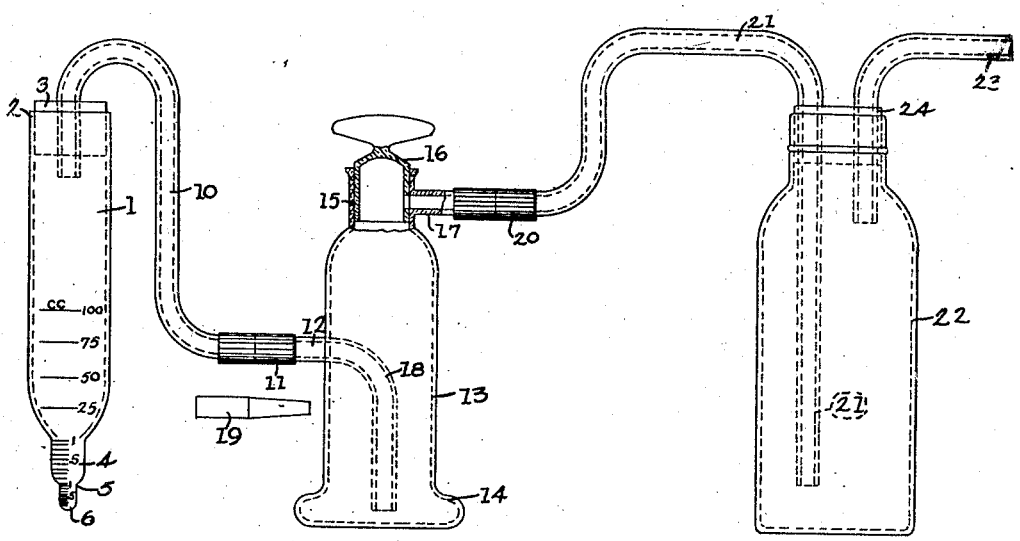
Figures 2, 3, 4:
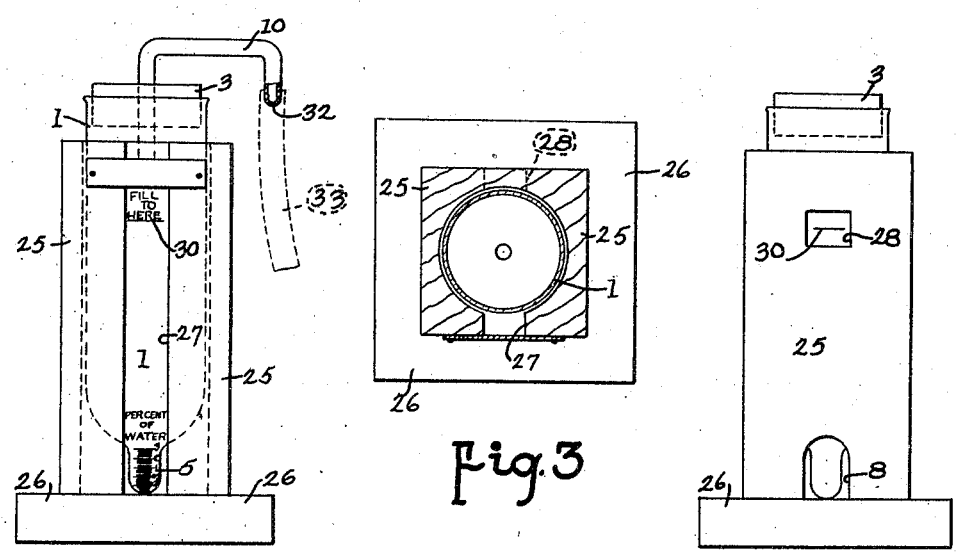

In the drawings accompanying and forming a part of this application Fig. 1 illustrates a preferred embodiment of my complete improved apparatus as employed in connection with my improved process; Fig. 2 is a side elevation of a simplified apparatus for the performance of my testing process; Fig. 3 is a sectional view corresponding to the lines 3—3 of Fig. 2; and Fig. 4 is a rear elevation of the apparatus shown in Fig. 2.

1 denotes a glass vessel having a cylindrical mouth 2 adapted for the reception of a rubber stopper 3 or other tightly fittings, removable closure, and having its lower end reduced in diameter to form a prolong 4 which in turn is again reduced to form a second prolong 5, the latter closed by an integral bottom 6. In the form shown the body of the vessel thus produced has a capacity of between 200 and 300 cubic centimeters, the prolong 4 a capacity of approximately 1 cubic centimeter and the prolong 5 a capacity of approximately $\frac{1}{10}$ cubic centimeter. I have found the following approximate dimensions very convenient; diameter of body 1½ inch, length of upper cylindrical portion 8 inches; diameter of first prolong $5\frac{1}{16}$ inch; length of first prolong 1½ inch; diameter of second prolong $\frac{5}{32}$ inch; length of second prolong ½ inch; total length of tube 10 inches.

This tube is accurately graduated on the lower prolong to 1/100 of a cubic centimeter. The larger prolong is graduated to $\frac{1}{10}$ cubic centimeter; and the lower tube portion is graduated at 25, 50, 75, and 100 c. c. although the 100 c. c. mark is by far the most important, the others being little if ever used.

This tube is here shown as coupled by means of a glass tube 10 and rubber connection 11 to the inlet connection 12 of a suitable absorption bulb, one type of which has an upright body 13 integral with a base 14 and terminating at its upper end in the neck 15 in which is rotatably fitted the combined stopper and cutout 16. The neck 15 has a connection 17 with which the stopper can be made to register and a solid glass stopper 19 is provided which can be used to close the sleeve 11 when the tube 10 is disconnected. The inlet connection 12 has an internal projection 18 leading to the lower end of the device and the body in use is filled with some loosely packed highly hygroscopic substance. The best material for this purpose that I have so far discovered is asbestos wool or other inert material thoroughly impregnated with powdered phosphoric anhydride ($P_2O_5$). The top and bottom of the absorption tube are preferably stuffed with asbestos wool, not impregnated, to prevent clogging.

The outlet neck 17 is connected by the rubber sleeve 20 to a bent glass tube 21 which dips beneath the surface of a quantity of concentrated sulphuric acid in the container 22. This container is also provided with a discharge tube 23, both the tubes 21 and 23 being received in a tight fitting rubber stopper 24. The tube 23 leads to some point of convenient discharge for the sulphur dioxide.

The apparatus is prepared for the test as follows: Into the bottom of the absorption tube 13 is put a thin layer of asbestos wool to prevent obstruction of the tube 18. The body of the tube is then filled to within about an inch of the top with a dry mixture of the asbestos wool (or other inert filler) and phosphoric anhydride. The space above is then filled with asbestos wool or the like tightly packed in after which the stopper 16 is applied. The phosphoric anhydride mixture can be made on any dry day without any undue absorption of moisture if everything is first got to hand and no undue delay is permitted. Sulphur dioxide gas must then be passed through the bulb for at least two hours after recharging and for fifteen minutes after the bulb has stood overnight. This can readily be done by means of the apparatus shown in the drawings, a quantity of sulphur dioxide being introduced into tube 1, the various connections made as shown, the stopper 16 turned to open position and the apparatus left to itself whereby the amount of heat absorbed by the tube 1 from the atmosphere will create a slow steady flow of sulphur dioxide.

As soon as this initial passage of sulphur dioxide has been effected (one of its main objects being to replace the air in the bulb completely with sulphur dioxide which is much heavier) the stopper 16 is closed, the connection 20 removed, the tube 10 replaced by the stopper 19 and the bulb weighed with the highest possible accuracy.

In order to conduct a test a fresh representative sample of 100 c. c. of the sulphur dioxide liquid is introduced into the clean and dry tube 1, this tube being preferably at about room temperature. It is then quickly closed by the stopper 3 (in order to minimize the opportunity of absorbing moisture from the atmosphere) and the apparatus connected as shown in the drawings and the sulphur dioxide allowed to evaporate naturally at room temperature until as much of the same has disappeared as will pass off under these conditions. This ordinarily requires several hours although it can be accelerated by gentle heating. However, it is best to allow plenty of time. The tube 1 is then warmed to room temperature (the evaporation of the sulphur dioxide always cools it much below this point), the stopper 16 is turned off, the connection 20 removed, and the tube 10 again replaced by the stopper 19, and the bulb again weighed. The total amount of water present is the sum of the weight remaining in the tube 1 and the increase in weight of the absorption tube.

In case the amount of liquid remaining in the bottom of the tube is sufficient to fill the prolongs 4 and 5 it is obvious at a glance that the sulphur dioxide is unduly impure for refrigerating purposes. Ordinarily the residue should not more than half fill the smaller prolong and the same is reduced to percentage by application of the formula $P = V/1.49$, herein $P =$ percentage of water by weight and 1.49 is the specific gravity of liquid sulphur dioxide. Thus in case the tube shows a residue of .03 c. c. the percentage of water corresponding thereto is $.03/1.49 = .020$.

Part of the water content also distills away with the sulphur dioxide and is caught by the absorption tube. Assuming that the same has increased in weight by an amount of .275 gram, the same formula is applied, namely $P = .275/1.49 = .018\%$. Accordingly the total percentage of water present in the sample was $.020 + .018 = .038$.

It is also possible and is within my invention to calibrate the prolongs of the tube 1 so as to exhibit directly the percentage of water present which requires merely that the value of the calibration be increased 49% over what it would be to read in cubic centimeters; and it is likewise possible by making up a special set of weights with which to weigh the absorption tube, such weights being increased in mass 49% over standard gram weights, to weigh the absorption tube directly in terms of water percentage.

In many cases, however, weighing of the absorption tube can be dispensed with, and even the tube itself omitted, although some kind of a closure 3 and tube 10 should still be employed to prevent the cold sulphur dioxide from absorbing moisture from the atmosphere. Experience shows that if the evaporation in tube 1 be conducted always under approximately the same conditions as regards access of heat, the amount of water vapor which distills over with the sulphur dioxide always bears approximately the same ratio to the amount left behind. Accordingly it is entirely possible to calibrate the tube 1 with this in view, the calibrations of the prolongs not only being adjusted for the specific gravity of sulphur dioxide but also for the amount of water which passed away as vapor. This mode of procedure avoids all weighing, all handling of chemicals, and affords a determination sufficiently exact for most purposes. It is important, however, in this case, to force the sulphur dioxide to evaporate at a uniform rate, and to compel this I prefer to enclose it in a suitable jacket which shall both hold it upright and regulate the rate of heat absorption. Such a device is shown in Figs. 2, 3, and 4, wherein 25 denotes hollow wooden upright carried by a base 26 and adapted to receive the tube 1. The upright has a slot or opening 27 in front to permit inspection of the liquid level, and is formed at the back with windows 28 and 29 opposite the graduations to facilitate reading the same.

The lower end of the tube 1 is made with a single prolong 5 calibrated directly in percent of water corresponding to a volume of sulphur dioxide indicated by the mark 30.

Needless to say this need not correspond to 100 c. c. or any other established quantity. It is best designated "Fill to here" or equivalent expression.

The top of the tube 1 is preferably provided with a stopper 3 and discharge tube 10 as before to prevent deposition of dew from the atmosphere, and instead of a sulphuric acid seal I have shown the end of the tube 10 as drawn down to a fine orifice 32 through which the sulphur dioxide vapor issues in the form of a fine jet which prevents the counterflow of air. A rubber tube 33 carries the vapor to any desired point of discharge.

The last described apparatus is not so accurate as that first described in the hands of a skilled analyst but is more accurate in the hands of a careless worker and is generally sufficiently accurate to determine whether a given specimen is or is not usable. In case the amount of water remaining in the tube is more than sufficient to fill the prolongs, it is obvious that no reading of its percentage is possible, but this has no practical disadvantage since such an amount of water is sufficient to render the liquid valueless for the purpose in view. It will be obvious that many changes can be made within the scope of my invention wherefore I do not limit myself in anywise except as specifically recited in my several claims which I desire may be construed, each independently of limitations contained in other claims.

Having thus described my invention what I claim is:

1. The method of testing liquid sulphur dioxide for moisture content which contains the steps of evaporating a measured volume of such liquid at about room temperature without access of air until the readily vaporizable substances have substantially escaped, measuring the volume of liquid remaining, absorbing and weighing the water vapor carried away by the gas, and calculating the amounts of such water residue and water vapor by reference to the specific gravity of liquid sulphur dioxide.

2. The method of determining approximately the percentage of water in liquid sulphur dioxide which contains the steps of evaporating a measured volume of such liquid at a slow rate in a confined space without access of air under substantially standard room-temperature conditions until the readily vaporizable substances have substantially escaped, measuring the volume of liquid remaining at such temperature, adding an equal amount to represent the amount of moisture carried off with the vapor, dividing that sum by the specific gravity of liquid sulphur dioxide, and reducing the result to a percentage of the original sample by volume.

In testimony whereof I hereunto affix my signature.

WILLIAM C. DEVER.